Aug. 22, 1933.  H. G. BERGSTROM ET AL  1,923,063
RECEPTACLE COVER AND MOUNTING STRUCTURE
Filed March 16, 1931
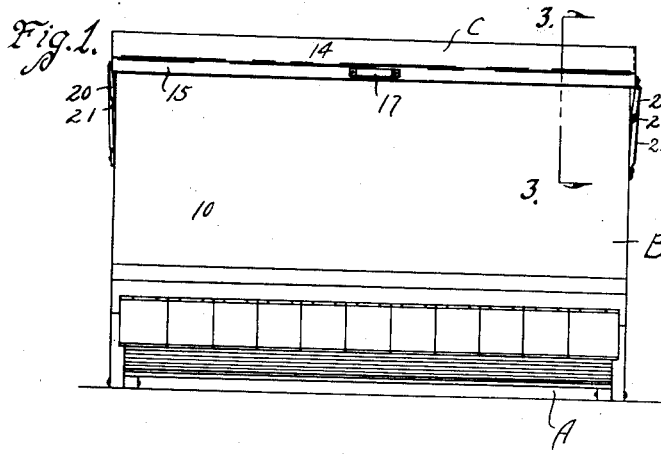
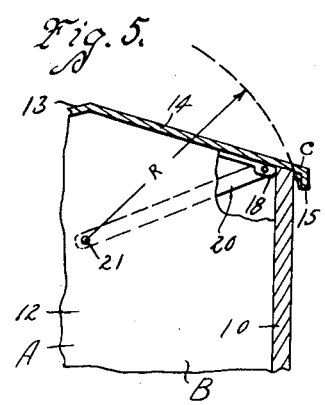
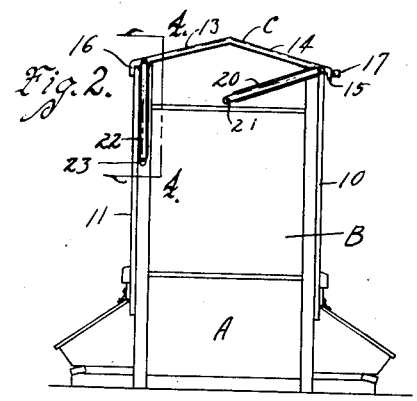
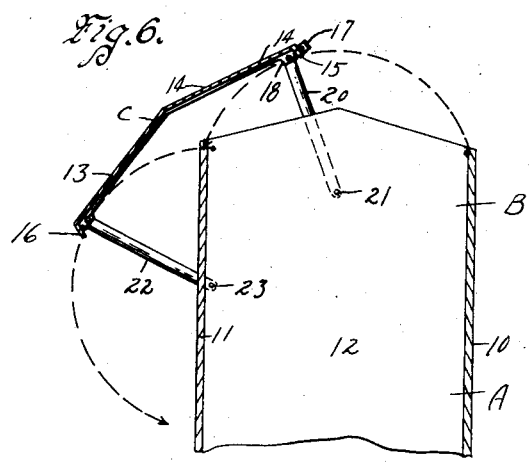
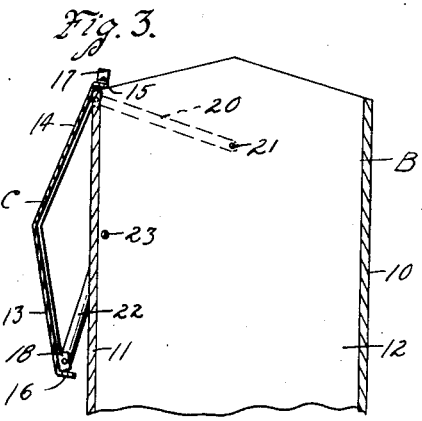
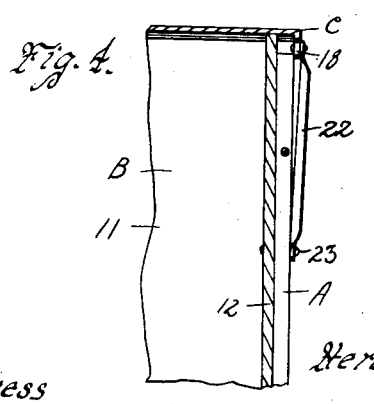
Inventor
Herbert G. Bergstrom & George B. Martin
by Bair, Freeman & Sinclair
Attorneys
Witness
H. S. Wingenmaier

UNITED STATES PATENT OFFICE 1,923,063

RECEPTACLE COVER AND MOUNTING STRUCTURE

Herbert G. Bergstrom and George B. Martin, Des Moines, Iowa, assignors to The Hargrove Company, Des Moines, Iowa, a Corporation of Iowa Application March 16, 1931. Serial No. 523,042

1 Claim. (Cl. 217—57)

The object of our invention is to provide a receptacle cover and mounting structure therefor.

More particularly, it is our object to provide a receptacle cover of the kind used for instance on stock feeders and the like and to provide means for mounting this cover on a receptacle such as a feed hopper in such manner that the receptacle will normally remain in place against accidental removal, but may be swung from position on top of the receptacle where it serves as a cover and closure to position at the side of the receptacle where no substantial part projects above the receptacle wall.

With these and other objects in view, our invention consists in the construction, arrangement and combination of the various parts of our receptacle cover and mounting structure, whereby the objects contemplated are attained, as hereinafter more fully set forth, pointed out in our claims, and illustrated in the accompanying drawing, in which:

Figure 1 is a front elevation of a hog feeder equipped with a cover and mounting therefor embodying our invention.

Figure 2 is an end elevation of the feeder shown in Figure 1.

Figure 3 is a detail, vertical sectional view taken on the line 3—3 of Figure 1 with the cover in its open and lowered position.

Figure 4 is a detail sectional view taken on the line 4—4 of Figure 2.

Figure 5 is a vertical sectional view, parts being broken away, the view being for the purpose of illustrating the arrangement of the cover and one of the mounting links; and Figure 6 is a view similar to that of Figure 3 with the cover partly open.

In the drawing herewith, we have used the reference character A to indicate generally a hog feeder which has a central hopper B, formed with what we will for convenience call the side walls 10 and 11, the wall 10 being at what may be considered the front of the feeder for the purposes of the description of the cover.

The feeder also has the end walls 12. The upper edges of the end walls 12 are shaped as shown for instance in Figures 3 and 6 with a central apex and the edge inclined slightly downwardly therefrom to the sides 10 and 11.

The cover which is the subject of our invention is a unitary structure, indicated generally at C, which, however, has the two sections 13 and 14, which are arranged to incline downwardly and laterally from the longitudinal center line of the receptacle to the sides thereof, as shown for instance in Figure 2.

The cover C thus fits the upper edges of the end members 12.

The cover C is provided at its sides with downhanging flanges 15 and 16 for better protection from the weather and so on. The flange 15 may be provided with a handle 17 for convenience in manipulating the top.

The cover normally rests on the receptacle B in the manner shown in Figure 2, supported on the upper edges of the end members 12 with the flanges 15 and 16 hanging down and slightly overlapping the side edges 10 and 11.

It is obvious that the cover may be provided with downhanging flanges at the ends of the device.

It is our purpose to provide means for mounting this cover for swinging movement in such manner that it may be moved from its closure position illustrated in Figure 2 and swung to hang down at the side of the receptacle B as shown in Figure 3, where no substantial part of it will project above the top of the receptacle.

Numerous hog feeders are made which have covers that can be swung part way to the position indicated, but parts of such covers project above the hoppers, where they are struck by animals and sometimes caught so as to cause the whole feeder to be upset. When struck by animals, they are sometimes broken or their hinge members are twisted out of shape.

We accomplish our purpose by providing the cover 10 with connecting means on its under side such as the ears 18. There are four of these ears 18 at the opposite ends of the cover C. All of them are outside the receptacle. Two of them are at the front of the device just rearwardly of the wall 10 and two of them are at what may be considered the rear of the device just inside the outline of the wall 11 (referring now to the positions of the parts when the cover is not serving as a closure).

Any connecting means may be used to serve the purpose of the ears 18.

Connected to the respective forward ears 18 are hinge arms 20 which when the cover is in closure position are inclined rearwardly and downwardly and are pivoted as at 21 to the respective end walls 12. Pivoted to the two rearward ears 18 are similar hinge arms 22 which incline downwardly and are pivoted to the walls 12 just forwardly of the wall 11 as at 23.

It is, of course, obvious that the arms 20 and 22 are entirely outside the receptacle B.

The lengths of the links are such and their points of attachment to the walls 12 are such that the cover may normally rest in the position shown in Figure 2 with the flanges 15 and 16 as shown in that figure, and yet when the handle 17 is grasped and the cover is swung upwardly and rearwardly, the flange 15 will clear and the entire cover will clear the rear wall 11 to permit the cover to be swung to the position shown in Figure 3, where the flange 15 rests on the upper edges of the end walls 12, which thus serve to support the cover with the least strain on the parts. Yet the cover when thus opened does not project substantially above the receptacle and therefore is not so likely to be struck and broken by animals and can not be engaged by the wind for blowing over the feeder.

It will be seen that we have provided a cover and mounting therefor of very simple and inexpensive construction which permits the cover to normally remain in place where it is least likely to be accidentally removed and yet permits it being swung to position alongside the receptacle where none of it projects substantially above the receptacle and yet where it is supported in such manner that the likelihood of injury is reduced to a minimum.

Some changes may be made in the arrangement and construction of the various parts of our receptacle cver and mounting structure without departing from the real spirit and purpose of our invention, and it is our intention to cover by our claims, any modified forms of construction or use of mechanical equivalents, which may be reasonably included within their scope.

We claim as our invention:

A cover and hinge structure adapted for use with a receptacle, and comprising a cover having down-turned flanges at its front and rear edges, hinged means comprising a bar at each end of the cover pivoted to the end thereof adjacent the rear edge and adapted to be pivoted to the receptacle and to stand in vertical position when the cover is closed, a bar pivoted to each end of the cover adjacent its front edge, and adapted to be pivoted to the receptacle and to be inclined rearwardly and downwardly when the cover is closed at a pivot point such that when the cover is swung to open position, the down-turned member on the cover will swing in a path so that it will engage the rear upper edge of the receptacle.

HERBERT G. BERGSTROM.
GEORGE B. MARTIN.